(12) United States Patent
Kroeker

(10) Patent No.: US 7,077,371 B1
(45) Date of Patent: Jul. 18, 2006

(54) SHOCK ABSORBER MOUNTING ASSEMBLY

(76) Inventor: Kent L. Kroeker, 29422 MacTan Rd., Valley Center, CA (US) 92082

(*) Notice: Subject to any disclaimer, the term of this patent is extended or adjusted under 35 U.S.C. 154(b) by 0 days.

(21) Appl. No.: 11/297,056

(22) Filed: Dec. 9, 2005

Related U.S. Application Data

(63) Continuation of application No. 10/853,051, filed on May 26, 2004, now abandoned.

(51) Int. Cl.
*E04G 3/00* (2006.01)
(52) U.S. Cl. ............... 248/205.1; 248/200; 267/320; 280/124.147
(58) Field of Classification Search ........... 248/200, 248/205.1, 694; 280/124.147, 124.55; 267/320; 188/321.11
See application file for complete search history.

(56) References Cited

U.S. PATENT DOCUMENTS

| | | | |
|---|---|---|---|
| 4,210,344 A | 7/1980 | Curnutt | |
| 4,616,810 A | 10/1986 | Richardson et al. | |
| 4,877,262 A | 10/1989 | Tanahashi et al. | |
| 5,133,573 A | 7/1992 | Kijima et al. | |
| 5,220,983 A | 6/1993 | Furrer et al. | |
| 5,344,124 A | 9/1994 | Runkel | |
| 5,392,886 A | 2/1995 | Drummond | |
| 5,431,363 A | 7/1995 | Ezzat et al. | |
| 5,785,344 A | 7/1998 | Vandewal et al. | |
| 5,941,508 A | 8/1999 | Murata et al. | |
| 6,079,526 A | 6/2000 | Nezu et al. | |
| 6,135,498 A | 10/2000 | Vlahovic | |
| 6,213,263 B1 | 4/2001 | De Frenne | |
| 6,334,517 B1 | 1/2002 | De Frenne | |
| 6,416,061 B1 | 7/2002 | French et al. | |
| 6,428,024 B1 | 8/2002 | Heyring et al. | |
| 6,572,089 B1 | 6/2003 | Zietsch | |
| 2002/0093168 A1 | 7/2002 | Hibbert | |
| 2002/0113397 A1* | 8/2002 | Svensson et al. | 280/124.155 |
| 2003/0102646 A1 | 6/2003 | Glocari et al. | |
| 2003/0116895 A1 | 6/2003 | Luncz | |
| 2003/0178269 A1* | 9/2003 | Hayashi et al. | 188/321.11 |
| 2004/0041320 A1* | 3/2004 | Hodumi | 267/220 |

* cited by examiner

*Primary Examiner*—Ramon O Ramirez

(57) ABSTRACT

A shock absorber mounting assembly includes a base plate with a circular peripheral edge. The plate has a centrally located primary axis and a centrally disposed aperture extending therethrough. The peripheral edge includes a linear portion. A line perpendicular to the linear portion and extending to the primary axis is less than 3.50 inches. A peripheral wall has a bottom edge integrally attached to the top side of the plate. The peripheral wall has a primary opening extending therethrough so that a shock absorber reservoir may be passed inward the aperture and outward through the peripheral wall. The peripheral wall has oppositely positioned first and second holes extending therethrough. A rod is extendable through first hole, a ball joint of a shock absorber and the second hole. Each of a plurality of bolts may be removably extended through bolt openings in the plate and into a vehicle chassis.

20 Claims, 8 Drawing Sheets

SHOCK ABSORBER MOUNTING ASSEMBLY

This file is a continuation of U.S. patent application Ser. No. 10/853,051 file on May 26th, 2004 now abandoned.

BACKGROUND OF THE INVENTION

1. Field of the Invention

The present invention relates to shock absorber mounting devices and more particularly pertains to a new shock absorber mounting device for attaching a shock absorber ball joint to a truck chassis.

2. Description of the Prior Art

The use of shock absorber mounting devices is known in the prior art. U.S. Pat. No. 4,877,2692 describes an annular support for positioning between a vehicle and shock absorber piston rod for the purpose of limiting vibrations. Another type of shock absorber mounting device is U.S. Pat. No. 6,572,089 that includes a twisting surface that aids in the alignment of a shock absorber as it is being mounted on a vehicle. Yet another such device is found in U.S. Pat. No. 5,431,363 that includes a first portion for receiving the upper end of a damper and a second portion that includes a seat for seating the upper end of a suspension spring. U.S. Pat. No. 5,133,573 describes a strut mounting structure.

While these devices fulfill their respective, particular objectives and requirements, the need remains for a device that allows sport shocks to be mounted on pick-up trucks. Such shocks include a ball joint, otherwise known as a Heim joint, as opposed to elastomeric joints found on conventional shock absorbers. The joints allow for movement of the shock absorber to move about its longitudinal axis. Heim joints, found on high-end sport shock absorbers, offer additional strength over elastomeric joints. Sport shocks also include a reservoir that typically comprises a nitrogen charged container. The reservoir is fluidly coupled to the shock absorber housing to provide the required biasing pressure to function properly under large loads such as a truck landing on a ground surface following a jump.

Aside from the different joints, the reservoir poses unique problems when mounting such a shock absorber on a vehicle, and in particular Dodge Ram 4×4 trucks that include Dodge Ram 2500 series four wheel drive trucks offered at least from 1994 to 2005, Dodge Rams 3500 series four wheel drive trucks offered from at least 1994 to 2005 and Dodge Ram 1500 series four wheel drive trucks offered from 1994 through 2001. Conventional mountings for these trucks do not have large enough openings extending therethrough to allow the reservoir to pass through the mounting. As such, a person wishing to mount a high performance shock absorber must disassemble it so that the reservoir is removed from the shock absorber housing. After the shock absorber is positioned within the mounting, the reservoir must again be coupled to the shock absorber. This is a time consuming and unpleasant task.

Additionally, the trucks in question may include a turbo charger. The turbo charger must be cleared when using a high performance shock absorber mounting. The mountings of the prior art will not both clear the turbo charger and provide the strength requirements needed for the type of off-road driving that would be expected by a person who utilized high performance shock absorbers.

What is needed is a mounting that allows a person to retrofit high performance shock absorbers to particularly designed trucks so that the truck is more versatile for off-road driving. The mounting should also allow for passage of the reservoir therethrough so that the reservoir need not be removed from the shock absorber. Finally, the mounting should have the ability to clear the turbo charger so that high performance shock absorbers may be retrofitted to the vehicle with only minimal effort.

SUMMARY OF THE INVENTION

The present invention meets the needs presented above by generally comprising a base plate that has a top side, a bottom side and a peripheral edge. The plate has a substantially circular shape such that the plate has a centrally located primary axis. The plate has a diameter generally between 6 inches and 7.5 inches. The plate has a centrally disposed aperture extending therethrough. The peripheral edge of the plate has notch therein such that a linear portion of the peripheral edge is formed. A line orientated perpendicular to the linear portion and extending to the primary axis is less than 3.50 inches. The base plate has a plurality of bolt openings extending therethrough. A tubular peripheral wall has a bottom edge and a top edge. The bottom edge is integrally attached to the top side of the plate. The peripheral wall has a primary opening extending therethrough so that a shock absorber reservoir may be selectively passed inward the aperture and outward through the peripheral wall. The primary opening has a width generally greater than between 2.50 inches and a height greater than 3.20 inches. The peripheral wall has a first hole and a second hole each extending therethrough. The first and second holes are positioned opposite of each other and each has an axis is aligned with each other. The first and second holes are positioned generally adjacent to the top edge. The second hole includes a threaded section. A rod has a first end and a second end. A head is integrally coupled to the first end. A threaded post is integrally attached to and extends away from the second end. The rod may be extended through a first hole in the peripheral wall, through a ball joint of a shock absorber and threadably coupled to a second hole in the peripheral wall such that the shock absorber is pivotally attached to the peripheral wall. Each of a plurality of bolts may be removably extended through one of the bolt openings and into a vehicle chassis.

The invention is further found in a base plate that has a top side, a bottom side and a peripheral edge. The plate has a substantially circular shape such that the plate has a centrally located primary axis. The plate has a centrally disposed aperture extending therethrough. The peripheral edge of the plate has notch therein such that a linear portion of the peripheral edge is formed. A line orientated perpendicular to the linear portion and extending to the primary axis is less than 3.50 inches. The base plate has a plurality of bolt openings extending therethrough. A generally conical peripheral wall has a bottom edge and a top edge. The bottom edge is integrally attached to the top side of the plate. The peripheral wall has a primary opening extending therethrough so that a shock absorber reservoir may be selectively passed inward the aperture and outward through the peripheral wall. The primary opening has a width generally greater than 2.50 inches and a height greater than 3.20 inches. The peripheral wall has a first hole and a second hole each extending therethrough. The first and second holes are positioned opposite of each other and each has an axis that is aligned with each other. The first and second holes are positioned generally adjacent to the top edge. The second hole includes a threaded section. A rod has a first end and a second end. A head is integrally coupled to the first end. A threaded post is integrally attached to and extends away from the second end. The rod may be extended through the first hole, through a ball joint and threadably coupled to the second hole such that a shock absorber is pivotally attached to the peripheral wall. Each of a plurality of bolts may be removably extended through one of the bolt openings and into a vehicle chassis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
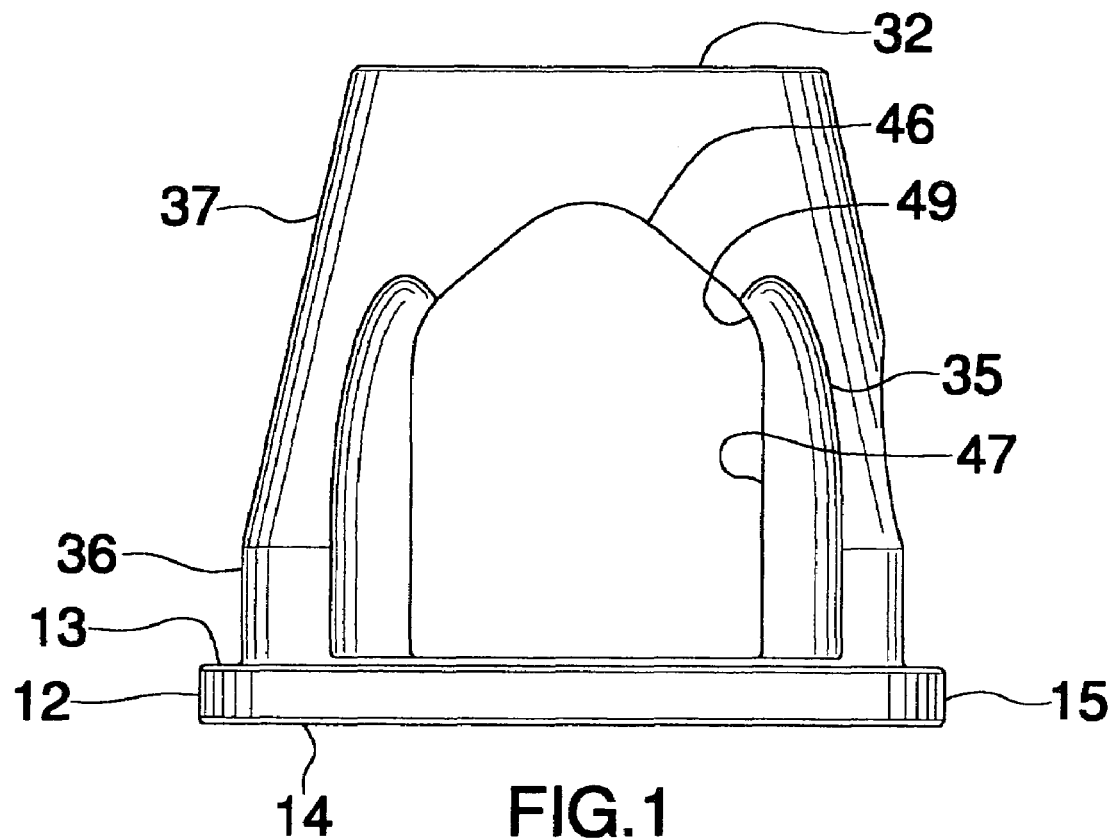
FIG. 1 is a front view of a shock absorber mounting assembly according to the present invention.
Figure 2:
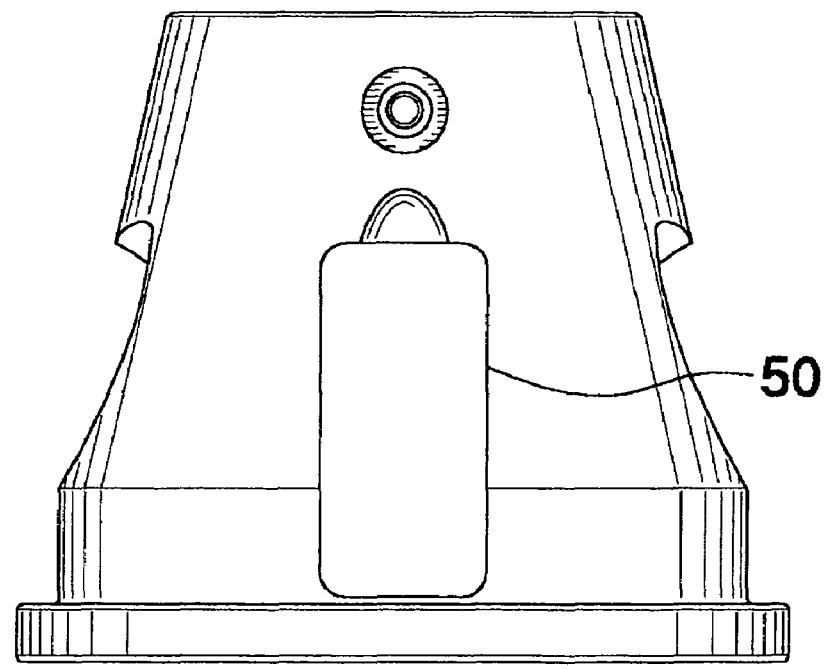
FIG. 2 is a right side view of the present invention.
Figure 3:
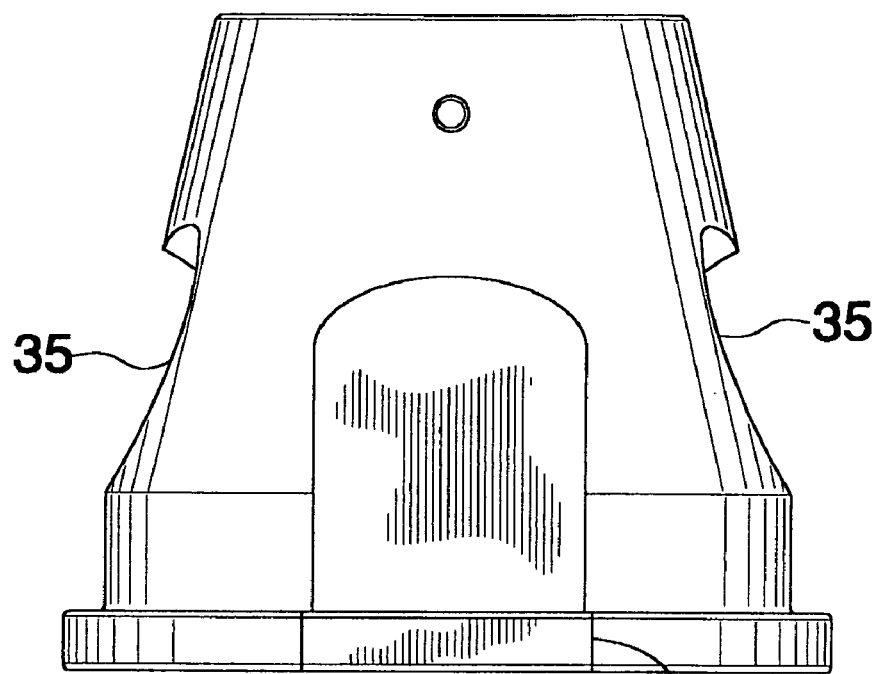
FIG. 3 is a left side view of the present invention.
Figure 4:
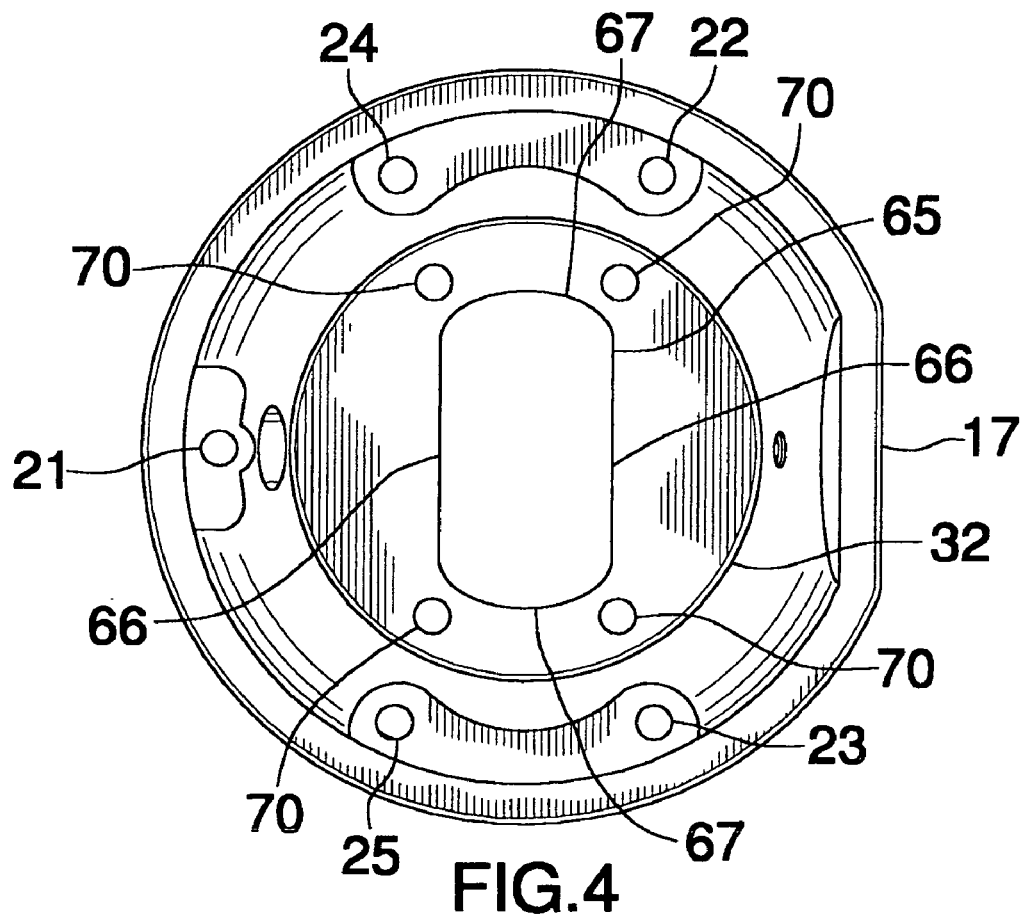
FIG. 4 is a top view of the present invention.
Figure 5:
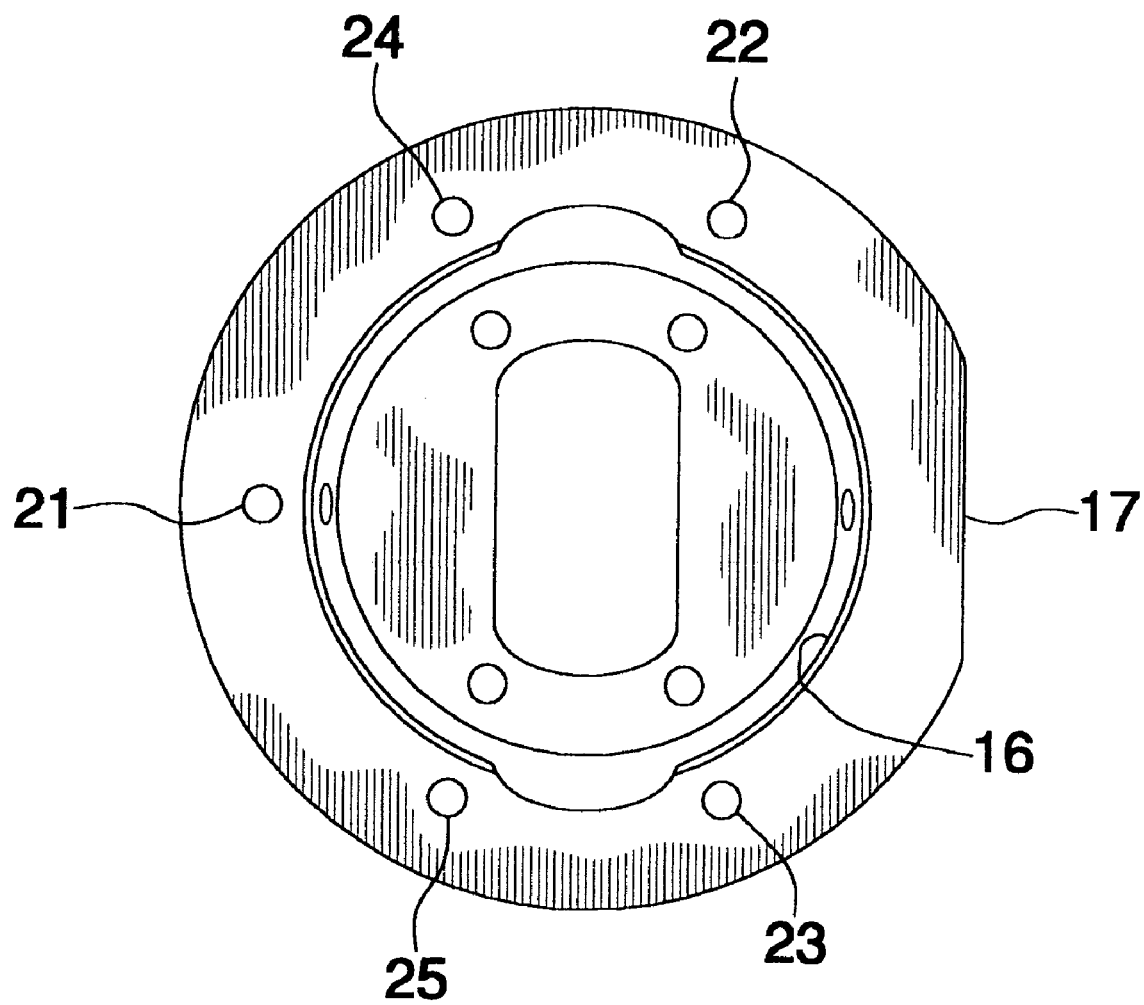
FIG. 5 is a bottom view of the present invention.
Figure 6:
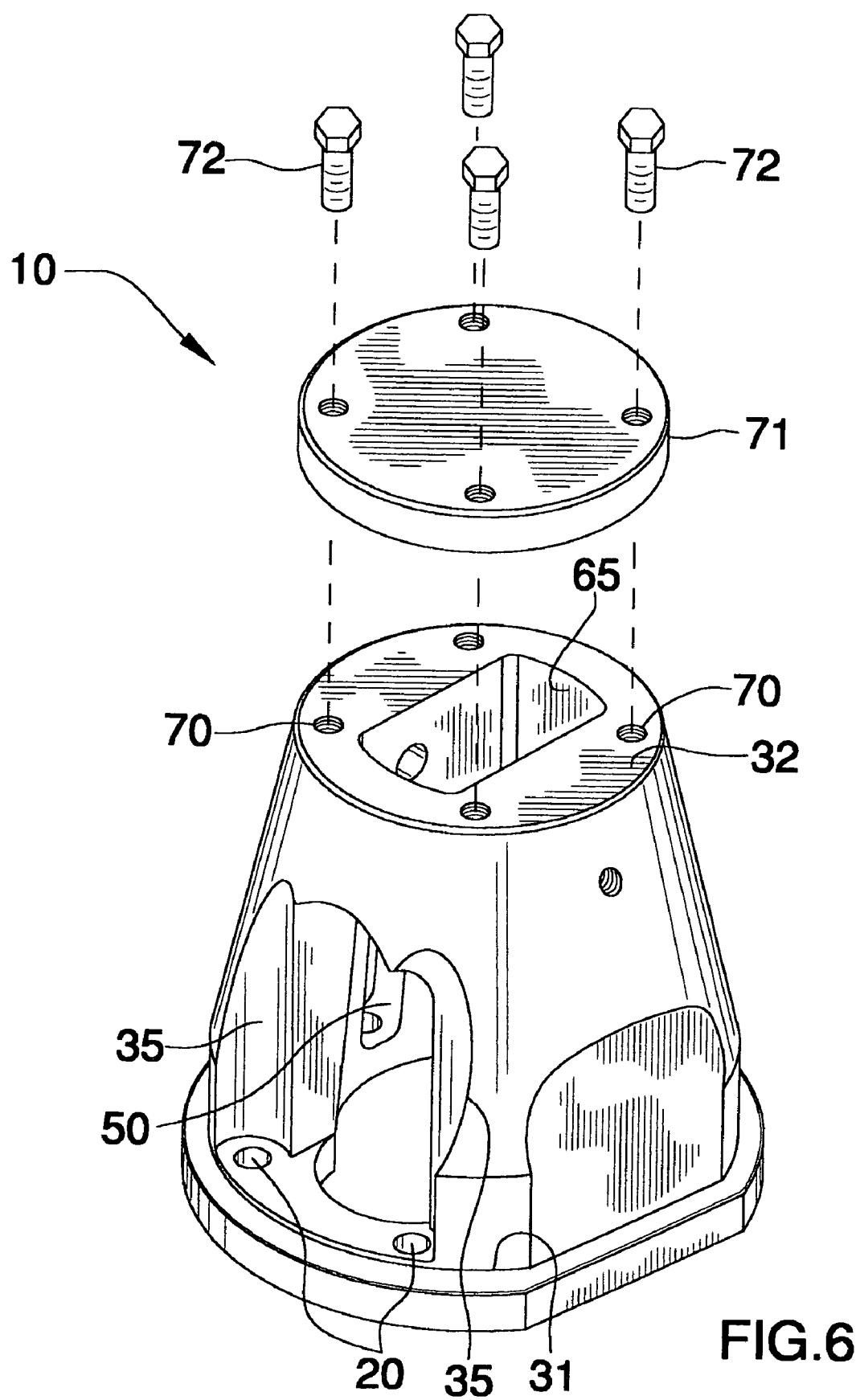
FIG. 6 is a perspective view of the present invention.
Figure 7:
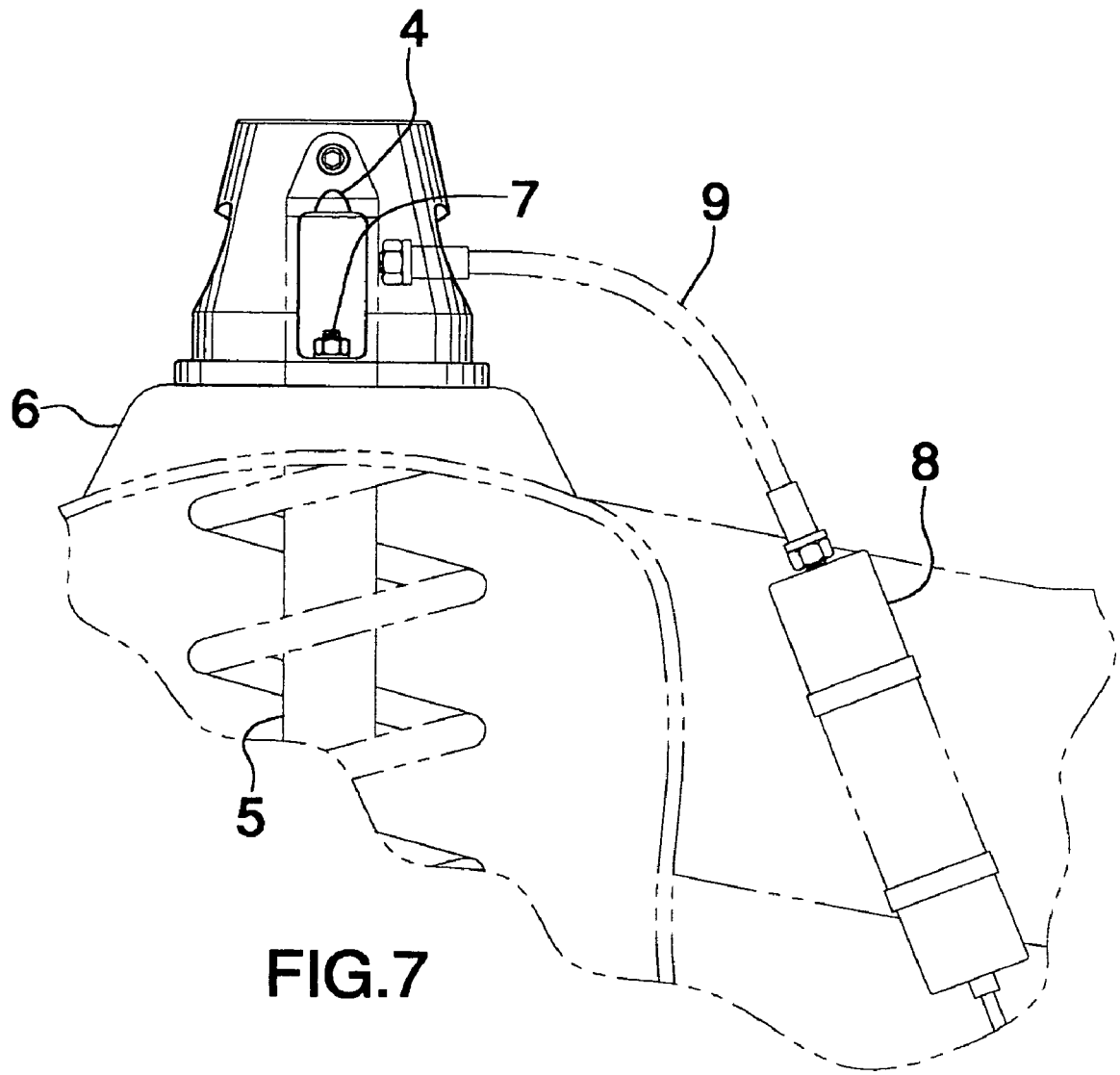
FIG. 7 is a side in-use view of the present invention.
Figure 8:
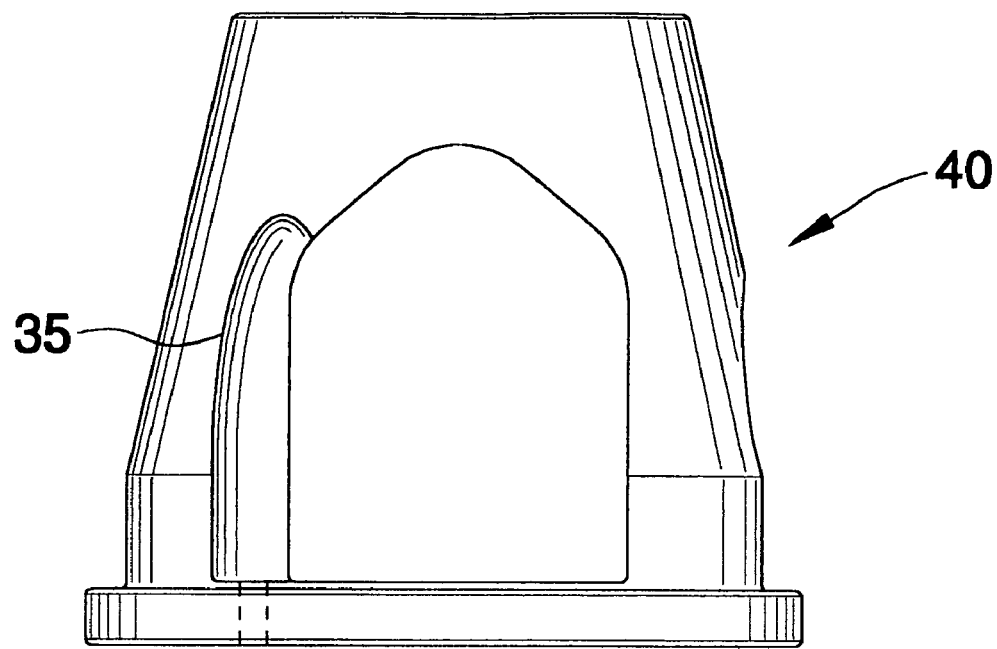
FIG. 8 is a front view of a second embodiment of the present invention.
Figure 9:
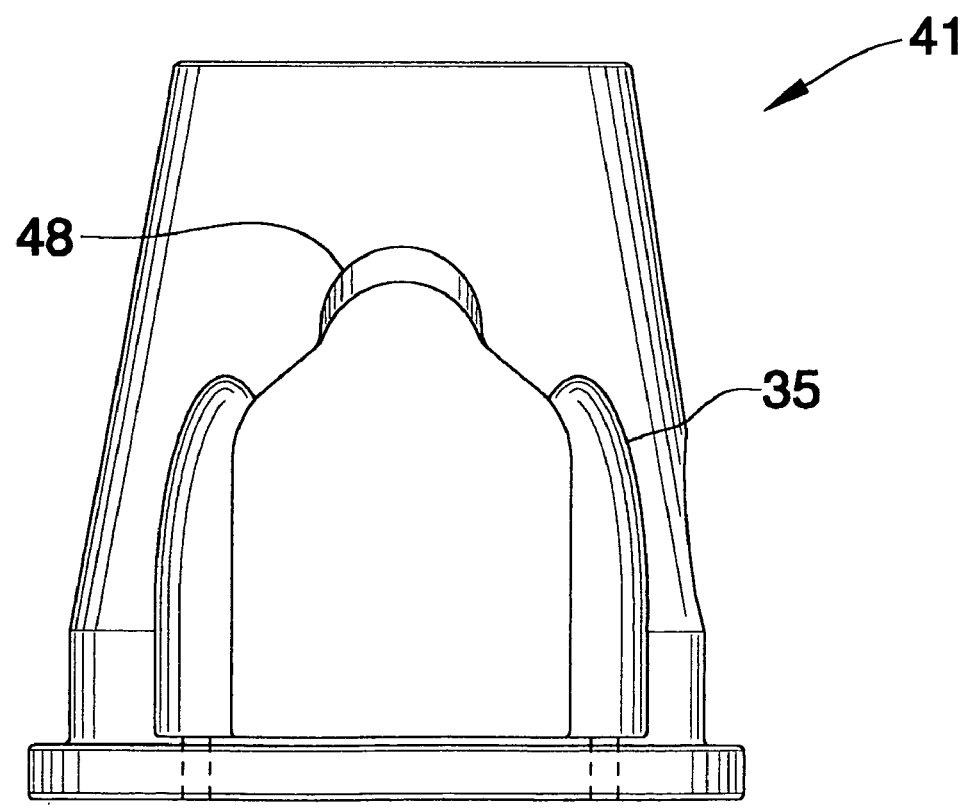
FIG. 9 is a front view of a third embodiment of the present invention.
Figure 10:
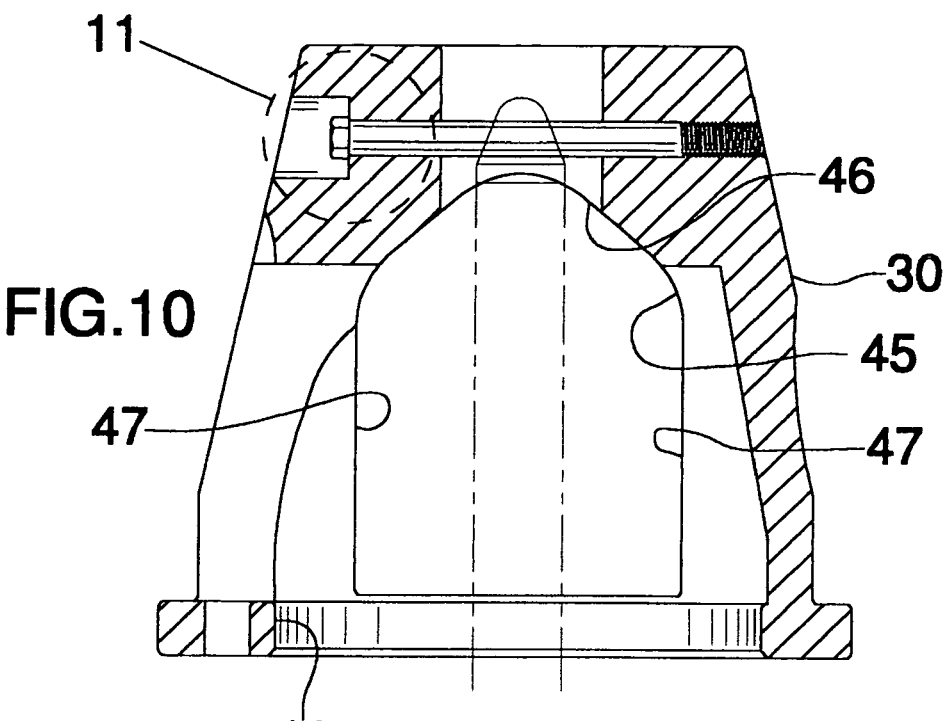
FIG. 10 is a cross-sectional view of the present invention.
Figure 11:
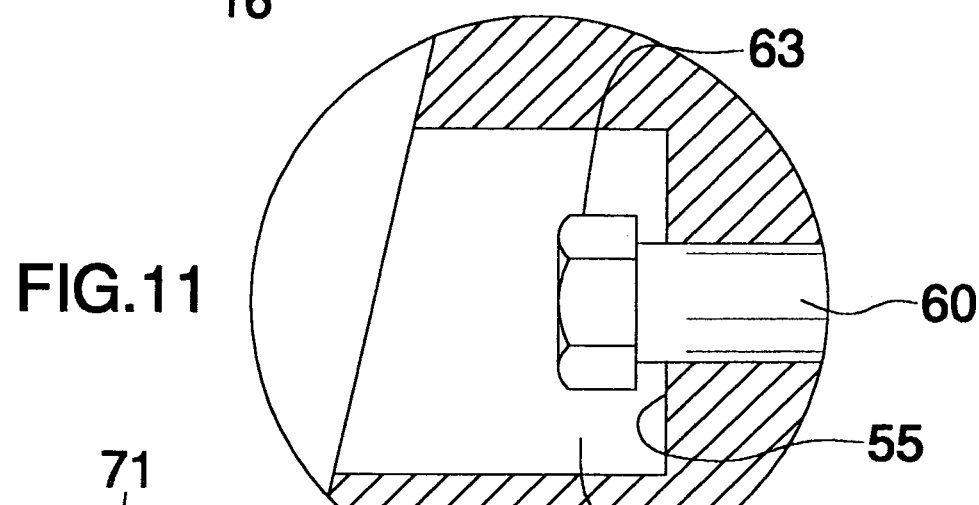
FIG. 11 is an enlarged view of the circle designated "11" on FIG. 10 of the present invention.
Figure 12:
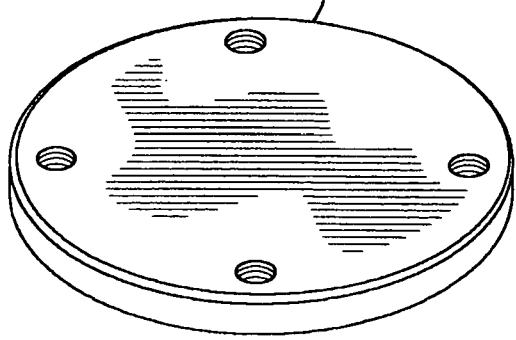
FIG. 12 is a perspective view of a cover of the present invention.
Figure 13:
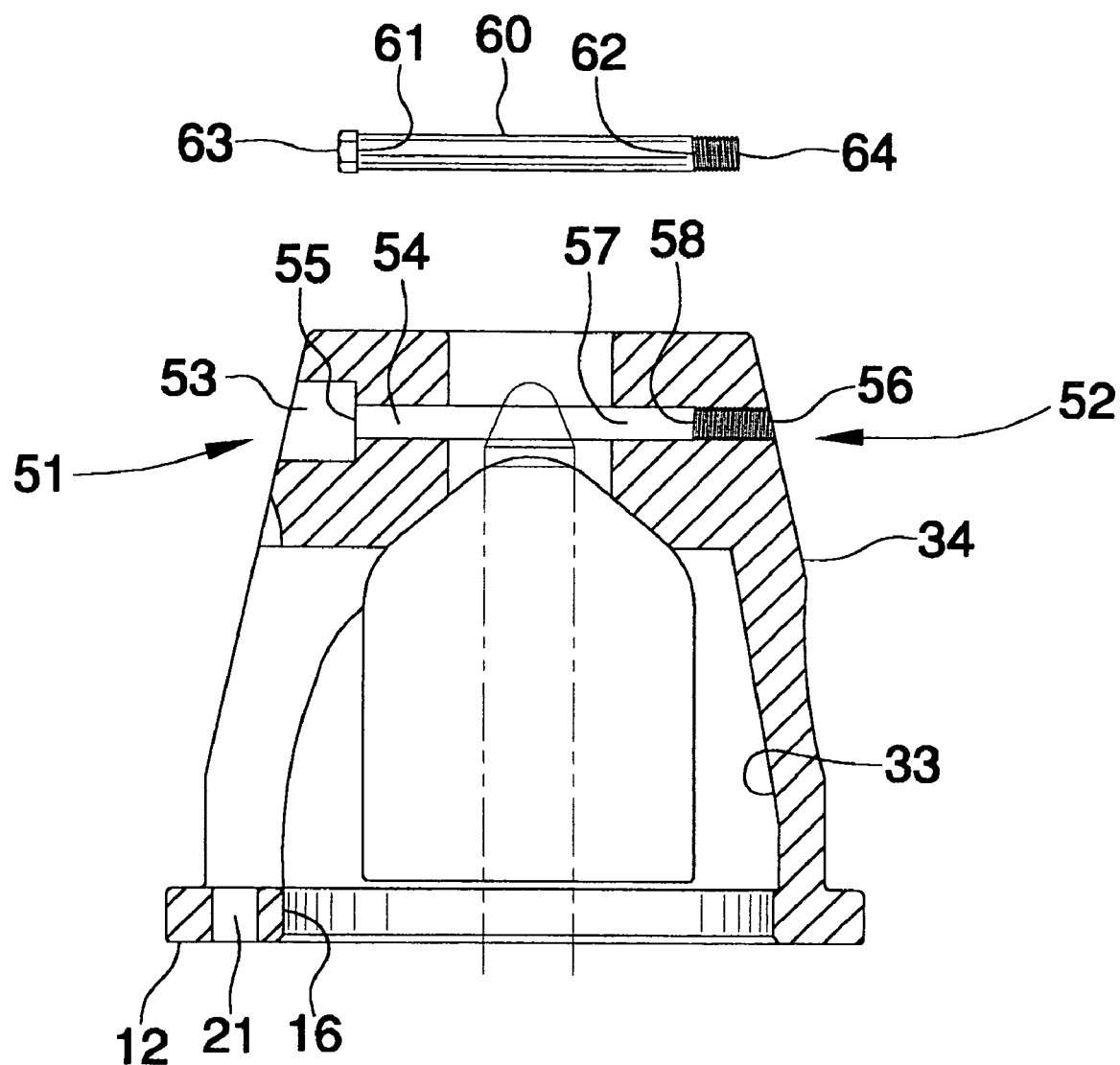
FIG. 13 is a cross-sectional view of the present invention.

With reference now to the drawings, and in particular to FIGS. 1 through 13 thereof, a new shock absorber mounting device embodying the principles and concepts of the present invention and generally designated by the reference numeral 10 will be described.

As best illustrated in FIGS. 1 through 13, the shock absorber mounting assembly 10 generally comprises a coupler adapted for attaching a ball joint 4, or Heim joint, of a shock absorber 5 to the chassis 6 of a vehicle. The assembly 10 includes a base plate 12 that has a top side 13, a bottom side 14 and a peripheral edge 15. The plate 12 has a substantially circular shape such that the plate 12 has a centrally located primary axis that is equidistant to the arcuate portions of the peripheral edge 15. The plate 12 has a diameter generally between 6.75 inches and 7.00 inches. The plate 12 has a centrally disposed aperture 16 extending therethrough. The aperture 16 is circular shaped and has a diameter generally between 3.25 inches and 3.75 inches. The peripheral edge 15 of the plate 12 has notch therein such that a linear portion 17 of the peripheral edge 15 is formed. A line orientated perpendicular to the linear portion 17 and extending to the primary axis has a length equal to 3.50 inches or less, preferably between 2.90 inches and 3.00 and more preferably equal to 2.937 inches.

The base plate 12 has a plurality of bolt openings 20 extending therethrough. A first 21 of the bolt openings 20 is positioned opposite of the linear portion 17 along a line extending through the primary axis and orientated perpendicular to the linear portion 17. A second 22 of the bolt openings 20 is positioned between about 100 degrees and 135 degrees away from the first 21 of the bolt openings 20 and more preferably about 120 degrees away from the first 21 of the bolt openings. A third 23 of the bolt openings 20 is positioned between about 100 degrees and 135 degrees away from the first 21 and second 22 bolt openings 20 and more preferably about 120 degrees away from the first 21 and second 22 bolt openings 20. A fourth 24 of the bolt openings 20 is positioned between the first 21 and second 22 of the bolt openings 20 and a fifth 25 of the bolt openings 20 is positioned between the first 21 and third 23 of the bolt openings 20. The bolt openings 20 are thereby preferably about 60 degrees apart from each other as measure from the primary axis, with the exception of the second 22 and third 23 of the bolt openings 20 which are about 120 degrees apart. Each of the bolt openings 20 is equally spaced from the peripheral edge 15 of the plate 12 a distance generally between 0.50 inches and 1.00 inches. Each of the bolt openings 20 preferably has a diameter equal to about 0.50 inches. The plate 20 has a height equal to about 0.50 inches.

A tubular peripheral wall 30 has a bottom edge 31 and a top edge 32. The bottom edge 31 is integrally attached to the top side 13 of the plate 12, and it is preferred that the plate 12 and peripheral wall 30 are milled from a single piece of material which is ideally an aluminum alloy or a steel alloy. One particular alloy that may be is used 6061T-6 aluminum alloy, which is widely available from a variety of sources. The peripheral wall 30 has an inner surface 33 and an outer surface 34. The inner surface 33 of the peripheral wall 30 extends along and abuts an edge of the aperture 16. The outer surface 34 of the peripheral wall 30 is spaced from the peripheral edge 15 of the plate 12 a distance generally between 0.50 inches and 1.00 inches. A thickness, or width, of the peripheral wall 30 increases from the bottom edge 31 to the top edge 32.

The peripheral wall 30 extends at least partially over each of the bolt openings 20. For this reason, the outer surface 34 of the peripheral wall 30 has a plurality of vertically orientated cutouts 35 therein. Each of the cutouts 35 is aligned with one of the bolt openings 20. The cutouts 35 allow each of a plurality of bolts 7 to be selectively extended along one of the cutouts 35 and extended through an aligned one of the bolt openings 20. The peripheral wall 30 includes a lower portion 36 adjacent to the bottom edge 31 and an upper portion 37 adjacent to the top edge 32. The lower portion 36 has a cylindrical shape and the upper portion 37 is frusto-conically shaped. The angle of the outer surface 34 of the upper portion 37 is generally between 60 degrees and 80 degrees with respect to a plane of the plate 12. Each of the upper 37 and lower 36 portions adjacent to the linear portion 17 is substantially planar, though the upper portion 37 may be concave or a concave depression may extend from the plate 12 and through a juncture of the upper 37 and lower 36 portions. This is required, as the linear portion 17 of the plate 12 would not allow the upper 37 and lower 36 portions to retain their shape adjacent to the linear portion 17. The linear portion 17, and the truncated upper 37 and lower 36 portions adjacent thereto, provide clearance for the assembly 10 with respect to a turbo charger. The top edge 32 preferably has a diameter generally between 3.00 inches and 5.00 inches.

The peripheral wall 30 has a height preferably between 4.50 inches and 6.50 inches. However, versions of the assembly are envisioned wherein the height of the peripheral wall may be as low as 2.00 and as high as 10.00 inches. The exact height is dependent upon the embodiment employed which would subsequently depend upon the type of shock absorber 5 being utilized. The second embodiment 40, shown in FIG. 8, only includes the first 31, second 32 and third 33 ones of the bolt openings 20 and has a peripheral wall 30 generally between 4.50 inches and 5.50 inches. The third embodiment 41, shown in FIG. 9, includes five bolt openings 20 and has a peripheral wall 30 having a height generally between 5.50 inches and 6.50 inches.

The peripheral wall 30 has a primary opening 45 extending therethrough so that a shock absorber reservoir 8 may be selectively passed inward the aperture 16 and outward through the peripheral wall 30. This allows for the mounting of the assembly 10 without disconnecting the reservoir 8 from the shock absorber 5. The primary opening 45 is positioned adjacent to the second bolt opening 22 so that the second bolt opening 22 is positioned between the primary opening 45 and the linear portion 17. The primary opening 45 has a width generally at least equal to 2.50 inches and preferably between 2.55 inches and 2.70 inches and more preferably equal to 2.625 inches. The primary opening 45 has an arcuate upper edge 46 that has a height that is greater than 3.00 inches, preferably between 3.30 inches and 3.40 inches and more preferably equal to 3.350 inches. The primary opening 45 preferably includes a pair of vertical side edges 47 leading to the arcuate upper edge 46. The side edges 47 are each at least 2.50 inches tall.

In the third embodiment 41, an apex 48 of the upper edge 46 is angled downward from the outer surface 34 to the inner surface 33 of the peripheral wall 30 at an angle generally between 40 degrees and 50 degrees with respect to plane of the plate 12. This angle allows for the feed tube 9 from a reservoir 8 to be angled upwardly from the shock absorber housing 5. The primary opening 45 extends into the cutouts 35 associated with the second 22 and fourth 24 ones of the bolt openings 20.

The peripheral wall 30 preferably has a secondary opening 49 extending therethrough that has substantially equal dimensions as to the primary opening 45. Preferably, the secondary opening 49 is a mirror image of the primary opening 45 and includes side edges 47 and an arcuate upper edge 46. The secondary opening 49 is positioned directly opposite of the primary opening 45 such that the secondary opening 49 extends into the cutouts 35 associated with the third 23 and fifth 25 ones of the bolt openings 20.

The peripheral wall 30 has a slot 50 extending therethrough. The slot 50 is positioned over the first one 21 of the bolt openings 20. The slot 50 has a width equal to at least about 0.23 inches and a height generally between 1.50 inches and 2.50 inches. The slot 50 aids a user of the assembly 10 in its installation by providing access to an interior of the assembly 10 which is bounded by the peripheral wall 30.

The peripheral wall 30 has a first hole 51 and a second hole 52 each extending therethrough. The first 51 and second 52 holes are positioned opposite of each other. The first 51 and second 52 holes each have an axis that are aligned with each other so that the first 51 and second 52 holes are diametrically opposed from each other. The axes of the first 51 and second 52 holes are spaced from the top edge 32 a distance generally between 0.75 inches and 1.25 inches. The axes are orientated perpendicular to the linear portion. This positioning places the first 51 and second 52 openings in the thickest areas of the peripheral wall 30 and away from the primary 45 and secondary 49 openings.

The first hole 51 includes a first portion 53 positioned adjacent to the outer surface 34 and a second portion 54 positioned adjacent to the inner surface 33. The first portion 53 has diameter greater than a diameter of the second portion 54 such that a first juncture 55 is defined between the first 53 and second 54 portions. The second hole 52 has a first section 56 positioned adjacent to the outer surface 34 and a second section 57 positioned adjacent to the inner surface 33. The second section 57 has a diameter substantially equal to the diameter of the second portion 54. The first section 56 is threaded and has a smaller diameter than the second section 57 such that a second juncture 58 is defined between the first 56 and second 57 sections.

A rod 60 has a first end 61 and a second end 62. The rod 60 has a length from the first end 61 to the second end 62 generally between 0.001 inches and 0.006 inches greater than a length measured from the first juncture 55 to the second juncture 58. The difference in length is preferably equal to about 0.002 inches. A head 63 is integrally coupled to the first end 61. The head 63 is preferably a bolt-type head. A threaded post 64 is integrally attached to and extends away from the second end 62. Ideally, the rod 60, head 63, and post 64 are one continuous bolt. The post 64 has substantially the same diameter as the first section 56 which is between 0.30 inches and 0.32 inches. The rod 60 has substantially the same diameter as the second section 57 which is between 0.48 inches and 0.52 inches. The head 63 has a size adapted for entering the first portion 53 and the first portion 53 is preferably is large enough so that a socket may be positioned around the head 63 while the head 63 is within the first portion 53. The difference in length between the rod 60 and the space between the first 55 and second 58 junctures reduces stress on the rod 60 and the peripheral wall 30 when the rod 60 flexes under weight.

The top edge 32 has an inner surface that defines an upper opening 65 of the peripheral wall 30. The upper opening 65 is elongated and has two side edges 66 and two end edges 67. Each of the side edges 66 is orientated perpendicular to the axes of the first 51 and second 52 openings. This again is to provide a greater thickness in the peripheral wall 30 where the first 51 and second 52 openings are positioned and also provides for the shape of the ball joint 4 saddle. Each of the side edges 66 has a length generally between 2.30 inches and 2.5 inches and each of the end edges 67 has a length smaller than a length of the side edges. The end edges 67 are preferably arcuate.

A plurality of threaded wells 70 extends into the top edge 32 of the peripheral wall 30. A cover 71 is removably positionable on the top edge 32. A plurality of fasteners 72, such as screws or bolts, is removably extendable through the cover 71 and into the wells 70 such that the cover 71 is removably coupled to the top edge 32. Each of the wells 70 is positioned adjacent to one of four junctures of the side edges 66 and the end edges 67. The wells 70 preferably have a diameter between 0.30 inches and 0.40 inches and a depth equal to about 1.00 inch.

In use, a reservoir 8 from a high performance shock absorber is extended through the aperture 16 and outwardly through the primary opening 45. The ball joint 4 is then positioned within the upper opening 65 so that the rod 60 may be extended through the first hole 51, then through the ball joint 4 and finally into the second hole 52 so that that the post 64 can be threadably coupled in the second hole 52 and the second end 62 of the rod 60 is abutting the second juncture 58. This secures the ball joint 4 within the assembly 10 so that the shock absorber 5 is pivotally attached to the peripheral wall 30. Each of a plurality of bolts 7 may be removably extended through one of the bolt openings 20 and into the chassis 6 and more particular into the spring bucket of the chassis so that the assembly 10 is secured to the vehicle. The generally conical structure of the peripheral wall 30 provides the most efficient design of the assembly 10 while still allow the movement required by the shock absorber 5.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coupler device adapted for attaching a ball joint of a shock absorber to the chassis of a vehicle, said device including:

a base plate having a top side, a bottom side and a peripheral edge, said plate having a substantially circular shape such that said plate has a centrally located primary axis, said plate having a diameter generally between 6.75 inches and 7.00 inches, said plate having a centrally disposed aperture extending therethrough, said aperture being circular shaped and having a diameter generally between 3.25 inches and 3.75 inches, said peripheral edge of said plate having a notch therein such that a linear portion of said peripheral edge is formed, a line orientated perpendicular to said linear portion and extending to said primary axis being equal to between 2.90 inches and 3.00 inches, said base plate having a plurality of bolt openings extending therethrough;

a tubular peripheral wall having a bottom edge and a top edge, said bottom edge being integrally attached to said top side of said plate, said peripheral wall having a primary opening extending therethrough so that a shock absorber reservoir may be selectively passed inward said aperture and outward through said primary opening in said peripheral wall, said primary opening having a width generally equal to between 2.55 inches and 2.70 inches, said primary opening having an arcuate upper edge having a height greater that 3.00 inches, said peripheral wall having a first hole and a second hole each extending therethrough, said first and second holes being positioned opposite of each other, said first and second holes each having an axis being aligned with each other, said axes of said first and second holes being spaced from said top edge a distance generally between 0.75 inches and 1.25 inches, said axes of said first and second holes being orientated generally perpendicular to said linear portion, said second hole including a threaded section;

a rod having a first end and a second end, a head being integrally coupled to said first end, a threaded post being integrally attached to and extending away from said second end; and wherein said rod may be extended through said first hole, through the ball joint and threadably coupled to said second hole such that the shock absorber is pivotally attached to the peripheral wall, wherein each of a plurality of bolts may be removably extended through one of said bolt openings and into the chassis.

2. The device according to claim 1, wherein a first of said bolt openings is positioned opposite of said linear portion along a line extending through said primary axis and orientated perpendicular to said linear portion, a second of said bolt openings being positioned generally between 100 degrees and 135 degrees away from said first of the bolt openings and a third of said bolt openings being generally between positioned 100 and 135 degrees away from said first and second bolt openings.

3. The device according to claim 2, wherein a fourth of said bolt openings is positioned between said first and second of said bolt openings and a fifth of said bolt openings is positioned between said first and third of said bolt openings.

4. The device according to claim 2, wherein said plate has a height equal to about 0.50 inches, said tubular wall having a height generally between 4.50 inches and 6.50 inches.

5. The device according to claim 4, wherein said peripheral wall has a secondary opening extending therethrough having substantially equal dimensions as to said primary opening, said secondary opening being positioned directly opposite of said primary opening.

6. The device according to claim 4, said peripheral wall having a slot extending therethrough, said slot being positioned over said first one of said bolt openings, said slot having a width equal to at least about 0.23 inches and a height generally between 1.50 inches and 2.50 inches.

7. The device according to claim 4, wherein said peripheral wall has an inner surface and an outer surface, said inner surface of said peripheral wall extending along and abutting an edge of said aperture, said outer surface of said peripheral wall being spaced from said peripheral edge of said plate a distance generally between 0.50 inches and 1.00 inches, a width of said peripheral wall increasing from said bottom edge to said top edge, said peripheral wall extending at least partially over each of said bolt openings, said outer surface of said peripheral wall having a plurality of vertically orientated cutouts therein, each of said cutouts being aligned with one of said bolt openings such that each of a plurality of said bolts may be selectively extended along one of said cutouts and extended through an aligned one of said bolt openings.

8. The device according to claim 7, wherein said peripheral wall includes a lower portion adjacent to said bottom edge and an upper portion adjacent to said top edge, said lower portion having a cylindrical shape, said upper portion being frusto-conically shaped, each of said upper and lower portions adjacent to said linear portion being substantially planar.

9. The device according to claim 8, wherein said top edge has a diameter generally between 3.00 inches and 5.00 inches.

10. The device according to claim 9, wherein said primary opening is positioned adjacent to said second bolt opening such that said second bolt opening is positioned between said primary opening and said linear portion.

11. The device according to claim 10, wherein said primary opening extends into said cutout associated with said second one of said bolt openings.

12. The device according to claim 11, wherein said peripheral wall has a secondary opening extending therethrough having substantially equal dimensions as to said primary opening, said secondary opening being positioned directly opposite of said primary opening and said secondary opening extending into said cutout associated with said third one of said bolt openings.

13. The device according to claim 1, wherein each of said bolt openings is equally spaced from said peripheral edge of said plate a distance generally between 0.50 inches and 1.00 inches.

14. The device according to claim 1, wherein said plate has a height equal to about 0.50 inches, said tubular wall having a height generally between 4.50 inches and 6.50 inches.

15. The device according to claim 1, wherein said first hole includes a first portion positioned adjacent to said outer surface and a second portion positioned adjacent to said inner surface, said first portion having diameter greater than a diameter of said second portion such that a first juncture is defined between said first and second portions, said second hole having a first section positioned adjacent to said outer surface and a second section positioned adjacent to said inner surface, said second section having a diameter substantially equal to said diameter of said second portion, said first section including said threaded section and having a smaller diameter than said second section such that a second juncture is defined between said first and second sections, said rod having a length from said first end to said second end between 0.001 inches and 0.003 inches greater than a length measured from said first juncture to said second juncture, said post having substantially the same diameter as said first section, said rod having substantially the same diameter as said second section, said head having a size adapted for entering said first portion.

16. The device according to claim 9, said top edge having an inner surface defining an upper opening of said peripheral wall, said upper opening being elongated and having two side edges and two end edges, each of said side edges being orientated generally perpendicular to said axes of said first and second holes, each of said side edges having a length generally between 2.30 inches and 2.5 inches, each of said end edges being arcuate and each having a length less than a length of said side edges.

17. The device according to claim 16, further including a plurality of threaded wells extending into said top edge of said peripheral wall, a cover being removably positionable on said top edge, a plurality of fasteners being removably extendable through said cover and into said wells such that said cover is removably coupled to said top edge, each of said wells being positioned adjacent to one of four junctures of said side edges and said end edges.

18. The device according to claim 1, further including a plurality of threaded wells extending into said top edge of said peripheral wall, a cover being removably positionable on said top edge, a plurality of fasteners being removably extendable through said cover and into said wells such that said cover is removably coupled to said top edge, each of said wells being positioned adjacent to one of four junctures of said side edges and said end edges.

19. The device according to claim 1, wherein:

a first of said bolt openings is positioned opposite of said linear portion along a line extending through said primary axis and orientated perpendicular to said linear portion, a second of said bolt openings being positioned about 120 degrees away from said first of the bolt openings, a third of said bolt openings being positioned 120 degrees away from said first and second bolt openings, a fourth of said bolt openings being positioned between said first and second of said bolt openings, a fifth of said bolt openings being positioned between said first and third of said bolt openings, each of said bolt openings being equally spaced from said peripheral edge of said plate a distance generally between 0.50 inches and 1.00 inches, each of said bolt openings having a diameter equal to about 0.50 inches, said plate having a height equal to about 0.50 inches;

said peripheral wall has an inner surface and an outer surface, said inner surface of said peripheral wall extending along and abutting an edge of said aperture, said outer surface of said peripheral wall being spaced from said peripheral edge of said plate a distance generally between 0.50 inches and 1.00 inches, a width of said peripheral wall increasing from said bottom edge to said top edge, said peripheral wall extending over said bolt openings, said outer surface of said peripheral wall having a plurality of vertically orientated cutouts therein, each of said cutouts being aligned with one of said bolt openings such that each of a plurality of bolts may be selectively extended along one of said cutouts and extended through an aligned one of said bolt openings, said peripheral wall including a lower portion adjacent to said bottom edge and an upper portion adjacent to said top edge, said lower portion having a cylindrical shape, said upper portion being frusto-conically shaped, each of said upper and lower portions adjacent to said linear portion being substantially planar, said top edge having a diameter generally between 3.00 inches and 5.00 inches, said peripheral wall having a height generally between 4.50 inches and 6.50 inches, said primary opening extending into said cutouts associated with said second and fourth ones of said bolt openings, said peripheral wall having a secondary opening extending therethrough having substantially equal dimensions as to said primary opening, said secondary opening being positioned directly opposite of said primary opening such that said secondary opening extends into said cutouts associated with said third and fifth ones of said bolt openings, said peripheral wall having a slot extending therethrough, said slot being positioned over said first one of said bolt openings, said slot having a width equal to at least about 0.23 inches and a height generally between 1.50 inches and 2.50 inches, said first hole including a first portion positioned adjacent to said outer surface and a second portion positioned adjacent to said inner surface, said first portion having diameter greater than a diameter of said second portion such that a first juncture is defined between said first and second portions, said second hole having a first section positioned adjacent to said outer surface and a second section positioned adjacent to said inner surface, said second section having a diameter substantially equal to said diameter of said second portion, said first section including said threaded section and having a smaller diameter than said second section such that a second juncture is defined between said first and second sections, said rod having a length from said first end to said second end between 0.001 inches and 0.006 inches greater than a length measured from said first juncture to said second juncture, said post having substantially the same diameter as said first section, said rod having substantially the same diameter as said second section, said head having a size adapted for entering said first portion, said top edge having an inner surface defining an upper opening of said peripheral wall, said upper opening being elongated and having two side edges and two end edges, each of said side edges being orientated perpendicular to said axes of said first and second holes, each of said side edges having a length generally between 2.30 inches and 2.5 inches, each of said end edges being arcuate and having a length less than said length of said side edges, said top edge having a plurality of threaded wells extending therein, a cover being removably positionable on said top edge, a plurality of fasteners being removably extendable through said cover and into said wells such that said cover is removably coupled to said top edge, each of said wells being positioned adjacent to one of four junctures of said side edges and said end edges.

20. A coupler device adapted for attaching a ball joint of a shock absorber to the chassis of a vehicle, said device including:

a base plate having a top side, a bottom side and a peripheral edge, said plate having a substantially circular shape such that said plate has a centrally located primary axis, said plate having a centrally disposed aperture extending therethrough, said peripheral edge of said plate having notch therein such that a linear portion of said peripheral edge is formed, a line orientated perpendicular to said linear portion and extending to said primary axis being less than 3.50 inches, said base plate having a plurality of bolt openings extending therethrough;

a generally conical peripheral wall having a bottom edge and a top edge, said bottom edge being integrally attached to said top side of said plate, said peripheral wall having a primary opening extending therethrough so that a shock absorber reservoir may be selectively passed inward said aperture and outward through said primary opening in said peripheral wall, said primary opening having a width generally greater than 2.50 inches and a height greater than 3.20 inches, said peripheral wall having a first hole and a second hole each extending therethrough, said first and second holes being positioned opposite of each other and each having an axis being aligned with each other, said first and second holes being positioned generally adjacent to said top edge, said second hole including a threaded section;

a rod having a first end and a second end, a head being integrally coupled to said first end, a threaded post being integrally attached to and extending away from said second end; and wherein said rod may be extended through said first hole, through the ball joint and threadably coupled to said second hole such that the shock absorber is pivotally attached to the peripheral wall, wherein each of a plurality of bolts may be removably extended through one of said bolt openings and into the chassis.

\* \* \* \* \*